United States Patent [19]

Gilb et al.

[11] Patent Number: 4,480,941
[45] Date of Patent: Nov. 6, 1984

[54] DOUBLE SHEAR ANGLED FASTENER CONNECTOR

[75] Inventors: Tyrell T. Gilb, Berkeley; Alfred D. Commins, Livermore, both of Calif.

[73] Assignee: Simpson Strong-Tie Company, Inc., San Leandro, Calif.

[21] Appl. No.: 472,273

[22] Filed: Mar. 4, 1983

[51] Int. Cl.³ .............................................. F16B 9/00
[52] U.S. Cl. .................. 403/232.1; 52/650; 248/216.1; 403/230
[58] Field of Search ............ 403/232.1, 13, 14, 283, 403/230; 248/546, 547, 217.2, 216.1; 52/650, 695, 696, 712

[56] References Cited

U.S. PATENT DOCUMENTS

| | | |
|---|---|---|
| 537,505 | 4/1895 | Van Dorn . |
| 753,053 | 2/1904 | Eberhardt . |
| 949,075 | 2/1910 | Hulett . |
| 3,036,347 | 5/1962 | Findleton . |
| 3,147,484 | 9/1964 | Nelson . |
| 3,601,428 | 8/1971 | Gilb . |
| 4,230,416 | 10/1980 | Gilb . |
| 4,291,996 | 9/1981 | Gilb . |
| 4,330,971 | 5/1982 | Auberger ................. 52/712 X |

FOREIGN PATENT DOCUMENTS 93998  5/1959 Norway .................. 403/232.1

OTHER PUBLICATIONS

*Popular Mechanics,* Maher, "Engineered Nailing", Aug. 1964, p. 137.

Primary Examiner—Cornelius J. Husar
Assistant Examiner—Joseph A. Fischetti
Attorney, Agent, or Firm—James R. Cypher

[57] ABSTRACT

A double shear angled fastener sheet metal connector for connecting a wood held member to a wood holding member wherein the connector includes a side member formed with a restricted opening and a held-holding fastener driven at an angle through a portion of the end of the held member and into the holding member. The head end of the fastener is closely held by the metal side member. In the preferred form, the connector is formed with a header side which is fastened to the holding member thereby limiting bending of the held-holding fastener.

15 Claims, 28 Drawing Figures

DOUBLE SHEAR ANGLED FASTENER CONNECTOR

BACKGROUND OF THE INVENTION

Prior to the advent of the metal connector in the late 1800's, structural wood members were commonly joined by a method known as toe nailing. In this method, a practice which is still being carried on, a wood joist for example is connected directly to a beam by driving nails at an angle through the joist and into the beam. Toe nailing frequently results in splitting the end of the joist member which can result in premature failure of the structure. There are two main reasons why toe nailing splits the end of the wood joist member. First, if the workman nails the joist too close to the joist end or causes the nail to penetrate the joist end at too shallow an angle, the joist end will split immediately. Second, even if the joist is correctly toe nailed, the joint is inherently weak since a load on the joist member sufficient to cause bending of the nails acts like a wedge in the joist end thereby initiating splitting. As a consequence of the inherently weak joint when toe nailing is used, building codes assign a low load carrying ability to toe nailed joints. In standard toe nailing the nails are all in single shear. Because toe nailing frequently results in splitting the end of the joist causing a weakening of the member and toe nailing is limited by the relatively low support value, workers in the art sought to provide metal connectors.

One of the earliest hangers known to applicant is Van Dorn, U.S. Pat. No. 537,505, a wrought metal joist hanger patented in 1895. The Van Dorn hanger is formed with header sides and top flanges which are nailed to the supporting header wood member and a seat for carrying the supported member; a design which has not changed in concept to the present time. The Van Dorn hanger was a radical departure from the accepted practice of the day since it entirely eliminated toe nailing and the consequent end splitting problem. Note that none of the fasteners penetrated both the held member and the holding member, and all nails remained in single shear.

Van Dorn was followed by Eberhardt, U.S. Pat. No. 753,053, who received a patent in 1904 for his sheet metal joist hanger which relied solely on a top flange to connect the hanger to the supporting wood member. A seat, as in Van Dorn, carried the supported member and, again, all toe nailing was eliminated. All the nails remained, however, in single shear.

In spite of the relatively early invention of sheet metal hangers, they did not come into wide usage until the 1940's when mass production of homes clearly demonstrated the superiority of using metal hangers. Several types of metal hangers and connectors were adopted and used and all of them avoided the problem of end splitting caused by toe nailing by never allowing any nails to penetrate both the held and holding members. Further, all of the previous metal hangers position the nail fasteners so that the nails are always in single shear.

Applicants have found only two connectors which are configured to permit toe nailing as well as standard single shear nailing.

In 1910, Hulett, U.S. Pat. No. 949,075 taught a porch hand rail support which had a seat for carrying the rail and a back wall with a large opening so that one or more nails could be driven through the top of the hand rail through the large opening in the metal bracket and thence into the post. No interlocking between the toe nails and the metal bracket occurred and all the nails remained in single shear. In 1962, Findleton obtained U.S. Pat. No. 3,036,347 for a joist hanger having the usual top flange for connection to the supporting member and a seat for carrying the supported member. Findleton's contribution to the art was a choice of two methods to prevent overturning of the supported member in the hanger. One of the methods was to provide a large hole in the back of the hanger like the Hulett bracket and permit the driving of a toe nail through the top of the supported member, through the large opening in the hanger and into the supporting beam. Again, the toe nail made no interlocking connection with the hanger itself and all the nails remained in single shear. While the toe nail provided some direct support for the joist member, most of the load was carried by the seat member of the hanger. The Findleton hanger, because of its tendency to split the joist end was not commercially adopted and is not known to be in present use.

An example of a joist hanger which is in wide commercial usage at the present time is Gilb, U.S. Pat. No. 3,601,428. This hanger is mass produced by means of progressive die techniques but, again, no toe nailing is provided. Nails in the side flanges are driven only into the supporting member and prongs and nails attach the sides of the metal hanger only to the supported member. Such hangers have no end splitting problem, but all nails are in single shear resulting in limited code load values for each nail resulting in a hanger which requires many nails and extra metal.

As mentioned previously, the practice of toe nailing still persists to this day and some workers in the field have tried to solve the end splitting problem with toe nailing devices such as the one shown in Nelson U.S. Pat. No. 3,147,484, 1964. But, as earlier stated, even with perfect toe nailing, the joint still remains inherently weak.

Two recent patents are relevant to the present invention. They are Gilb, U.S. Pat. No. 4,230,416, 1980, and Gilb, U.S. Pat. No. 4,291,996, 1981. Gilb '416 taught the use of a restricted nail slot opening so that a nail could be driven on a slant. The slot openings are used for skewed angle hangers. No toe nailing is involved and one set of nails connects the back flanges to the supporting member and the other set of nails connects the sides of the hanger to the supported member thus all nails are in single shear.

In Gilb, '996, a positive nail angling device is taught to prevent splitting of laminated wood members such as plywood and prefabricated wood joists (Microlams) by insuring that the nails are driven at an angle into the laminated wood members rather than parallel to the laminations. The positive nail angling device also solves the problem of beam failures due to suspension of the supported member on the side nails after wood shrinkage and subsequent reapplication of large loads on the suspended supported member. Splitting of the supported wood member may occur when the wood member is forced back down on the supporting seat. Gilb, in his '996 patent supra follows the standard hanger practice of carrying the supported member on a hanger seat and providing no toe nailing or direct nail connection between the supported member and the supporting member. All nails are in single shear resulting in the use of many nails and extra metal to provide for the many nail openings.

In the light of the present disclosure, it is now possible to see that, the connectors of the last 87 years were inefficient in that they required far too many nails and used 40 to 50% more metal than the connectors described in this application. Simply stated, the connectors of the past 87 years were designed so that each and every nail used in the hangers was in single shear which can carry a relatively low load value. Further, all of the prior art hangers just supported vertical loads and only nominally prevented "uplift". Recently "uplift" has become a common requirement for seismic and hurricane code requirements. Present hangers require top straps to meet seismic codes. This "band-aid" approach is expensive and generally unsatisfactory.

SUMMARY OF THE INVENTION

This application discloses the first sheetmetal connector ever to connect a held wood member to a holding wood member in which a substantial number of the nails are in double, instead of single shear. This is accomplished by first inserting the nail through a specially formed opening in the sheet metal connector, then through the held member and finally through the holding member also. Since nails in double shear are rated at twice the load value of nails in single shear, load values for the connector are dramatically increased.

The connector of the present invention has proven so effective that for most forms of the connector, on average, the number of nails used can be reduced by 40% and there is a 40% increase in holding strength.

Since the number of required nails is reduced, the installation time is substantially reduced. Tests have shown that at current labor rates, the savings in labor costs for installation alone is in excess of the cost of the connector as compared with comparable prior art connectors.

Using the teachings of the present invention, the weight of many connectors can be reduced 40 to 50% thereby resulting in substantial material savings and substantial energy savings; both in manufacture and shipping.

Another feature of the present invention is the fact that uplift resistance has tripled, overturn stiffness has doubled and full seismic values are provided.

The connector of the present invention is a true connector. Typical top-strap-tie "band-aid" elements can now be eliminated since the present hanger resists forces in all directions. In many instances, one-piece sheetmetal connectors can be used which formerly required complicated welded connectors.

In some connectors, the seat may be entirely eliminated or disregarded for purposes of calculating load value. Thus, where beam splitting has been a problem due to wood shrinkage and lifting of the held member off the hanger seat, the problem has been reduced by the use of the connector of the present invention.

DESCRIPTION OF THE PREFERRED EMBODIMENTS OF THE INVENTION

The present invention is a sheet metal wood-to-wood structural connector for joining wood members including: an elongated wood structural holding member such as a beam 1 having a generally planar connecting face 2; an elongated wood structural held member such as a joist 3 having a generally planar first side face 4 and a generally planar end face 5 in abutting face-to-face contact with the planar connecting face; a connector 6 having a first metal side member 7 having portions in a first plane 8 engaging the first side face of the held member and formed with a first restricted opening 9 therethrough; a first held-holding fastener 10 having a shank 11 formed with a head 12, a head end shank portion 13, a proximal held shank portion 14 and a distal holding shank portion 15 with the head having a width greater than the width 16 of the first restricted opening in the side member of the connector, adapted for being driven through a portion of the held member and into the holding member so that the distal holding shank portion penetrates a portion of the holding member for secure holding relation by the holding member and the proximal held shank portion is in secure closely held contact with a portion of the held member; the first held-holding fastener and the first plane of the first metal side form a first selected angle 17; and the first restricted opening is formed with a width slightly larger than the width of the head end shank portion of the first held-holding fastener so that when the first fastener is inserted through the first restricted opening at the first selected angle, the sides 18 and 19 of the first restricted opening register with opposed sides of the head end shank portion of the first held-holding fastener and prevent relative movement between the first held-holding fastener and the connector. The operation of the elongated opening is more particularly described in Gilb, U.S. Pat. No. 4,230,416.

Figures 3, 4:
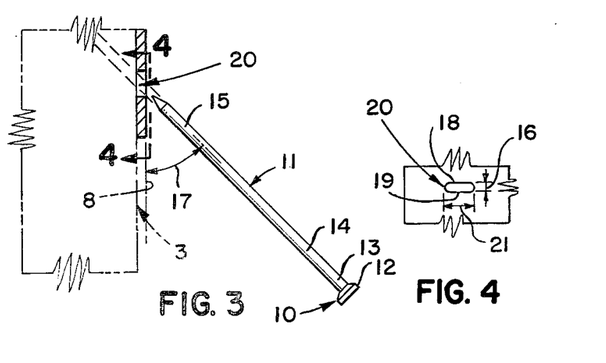
FIG. 3 is a cross sectional view of an alternate nail guidance structure taken in the same vicinity as the illustration shown in FIG. 2.
FIG. 4 is a side view of the alternate nail guidance structure taken along line 4—4 of FIG. 3.
Figure 5:
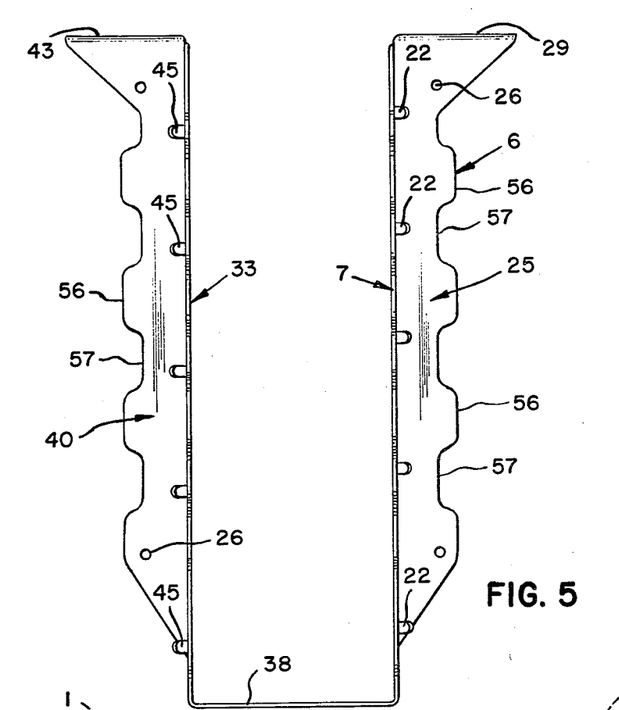
FIG. 5 is a front elevation view of the connector shown in FIG. 1.
Figure 6:
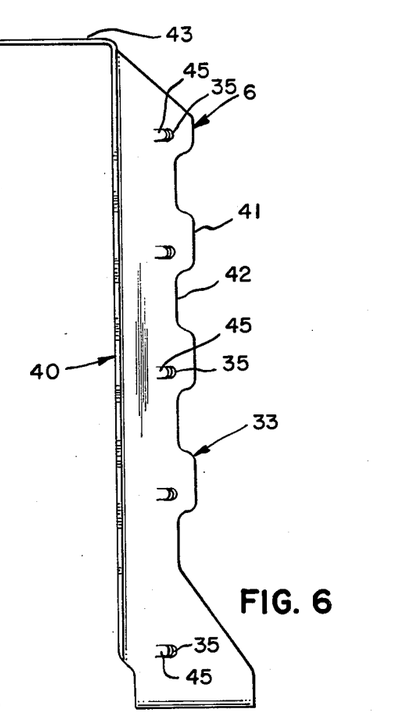
FIG. 6 is a side elevation view of the connector shown in FIG. 5.

The sheetmetal connector may have patterned sides particularly at the fastener opening but preferably the first side member is formed as a substantially planar member and the restricted opening is an elongated slot 20 as shown in FIGS. 3 and 4 having a length 21 substantially greater than its width 16.

Figure 1:
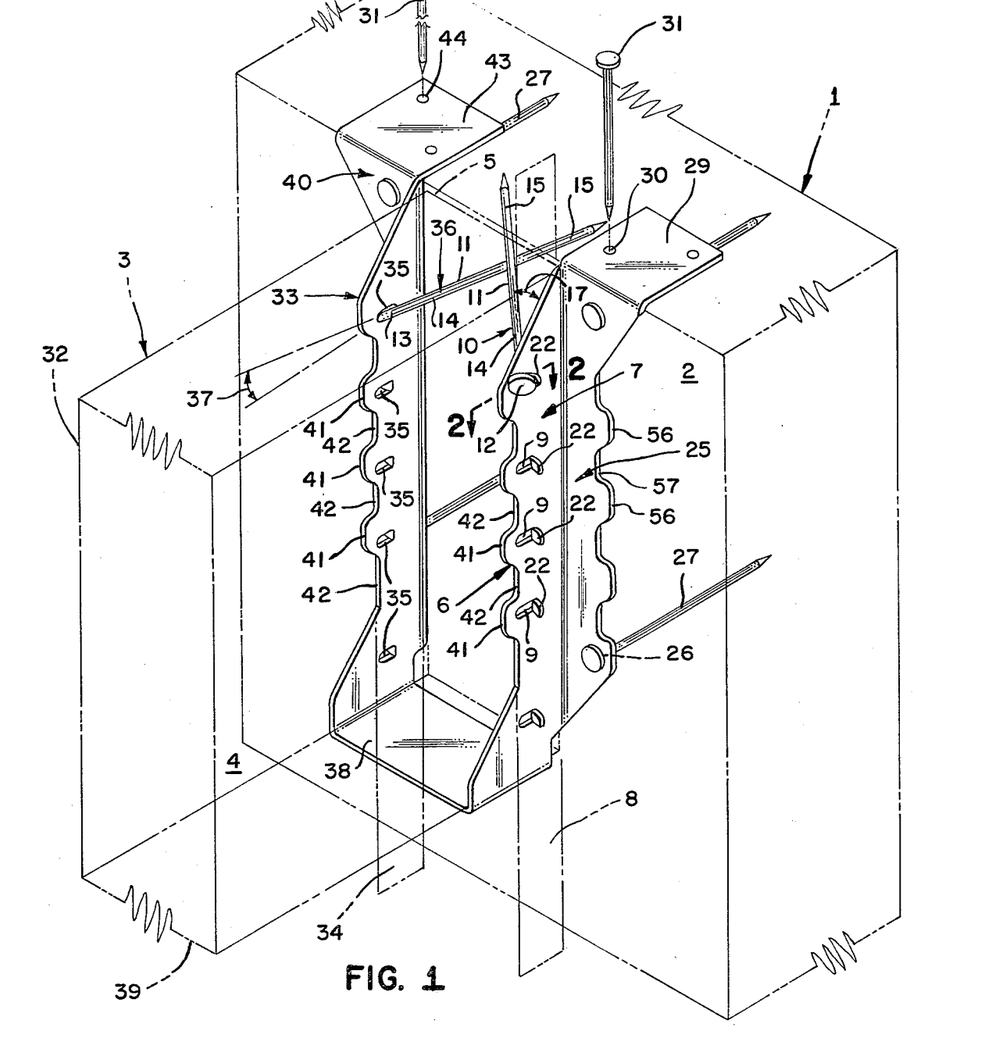
FIG. 1 is a perspective view of one form of the connector of the present invention connecting a supporting member and a supported member shown in phantom line. Some of the nails are omitted for clarity.
Figure 2:
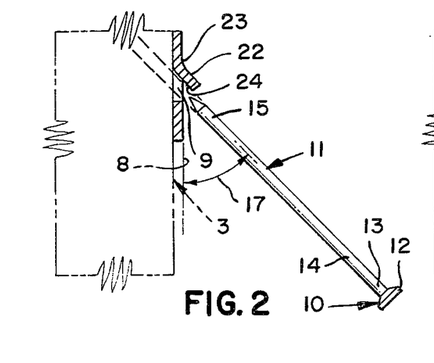
FIG. 2 is a cross sectional view taken along line 2—2 of FIG. 1 showing a portion of the connector on an enlarged scale illustrating one form of nail guidance structure.

Preferably, the connector is formed with a fastener guide such as is shown in FIGS. 1 and 2 which includes a tab-like member 22 formed from the displaced face material from the first restricted opening and bent along a bend line 23 which constitutes one end of the opening; and the tab-like member is formed with a fastener receiving surface 24 for positively receiving a side of the first held-holding fastener in generally parallel, face-to-face relationship; and the length of the first restricted opening is selected to receive the first held-holding fastener only at the pre-selected angle in relation to the first plane of the first metal side member so that one side of the shank of the fastener is in touching or close fitting relation to one end of the first restricted opening and the opposite side of the nail shank is in touching or close fitting relation to the fastener receiving surface of the tab-like member. The fastener guide is more particularly described in Gilb U.S. Pat. No. 4,291,996.

For optimum results, the fastener should be driven through the connector and the wood members at an angle so that the proximal held shank portion and the distal holding shank portion of the fastener are each embedded an approximately equal distance in the held and holding members respectively. In the preferred form of the invention, the connector should be constructed so as to minimize bending of the held-holding fastener. One method is to provide a first metal header side member 25 integrally attached at an angle to the first metal side member 7 and positioned in engagement with the planar connecting face of the wood holding member and formed with at least one header fastener opening 26 therethrough; and a header fastener 27 inserted through the header fastener opening joining the metal header side to the holding member and thereby causing the head end shank portion of the first held-holding fastener to be securely held in relation to the holding member, resulting in a surprising reduction in end splitting of the held member due to the relative absense of bending in the proximal held shank portion of the first held-holding fastener under normal design loading.

Another equally preferred way to minimize bending of the held-holding fastener is to provide a first top flange 29 connected to the first metal side member 7 at an angle and formed with a first top flange opening 30 therethrough; and a first top flange fastener 31 dimensioned for insertion through the opening in the first top flange and into the holding member.

Still another preferred way to minimize bending of the held-holding fastener is to provide a first top flange such as flange 29 connected to the first metal header side member 25 at an angle and formed with a first top flange opening such as opening 30 therethrough; and a first top flange fastener such as fastener 31 dimensioned for insertion through the opening in the first top flange and into the holding member.

Figure 28:
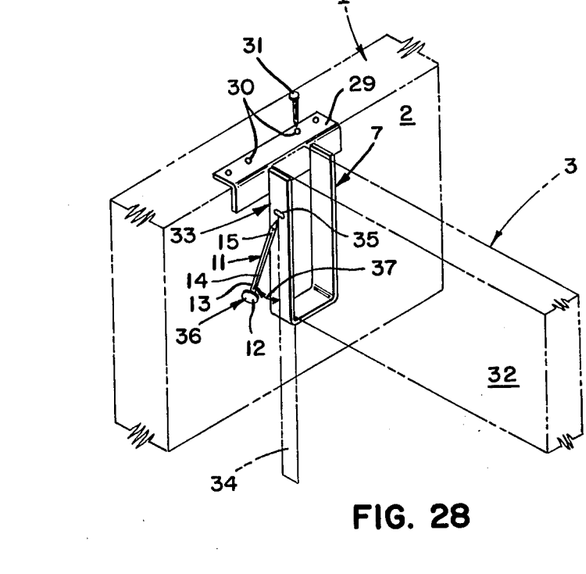
FIG. 28 is a perspective of another form of the invention.

The sheetmetal connector may be constructed as in FIG. 28 wherein the elongated wood structural held member 3 includes a second generally planar side face 32; a second metal side member 33 connected to the first top flange having portions in a second plane 34 engaging the second side face of the held member and formed with a second restricted opening 35 therethrough; a second held-holding fastener 36 having a shank 11 formed with a head 12, a head end shank portion 13, a proximal held shank portion 14 and a distal holding shank portion 15 with the head having a width greater than the width of the second restricted opening in the second side member of the connector adapted for being driven through a portion of the held member and into the holding member so that the distal holding shank portion penetrates a portion of the holding member for secure holding relation by the holding member and the proximal held shank portion is in secure closely held contact with a portion of the held member; the second held-holding fastener and the second plane of the second metal side form a second selected angle 37; and the second restricted opening is formed with a width slightly larger than the width of the head end shank portion of the second held-holding fastener so that when the second held-holding fastener is inserted through the second restricted opening at the second selected angle, the opposed edges of the sides of the second restricted opening register with opposed sides of the head end shank portion of the second held-holding fastener and prevent relative movement between the second held-holding fastener and the connector.

For ease in positioning and for added strength, the sheetmetal connector as in FIG. 1 may include in combination with the elongated wood structural held member having a second generally planar side face 32 and a bottom edge face 39; a second metal side member 33 having portions in a second plane 34 engaging the second side face of the held member and formed with a second restricted opening 35 therethrough; a metal strap member 38 joining the first and second metal side members and positioned in engagement with the bottom edge face of the held member to assist in positioning the connector; a second held-holding fastener 36 having a shank 11 formed with a head, a head end shank portion 13, a proximal held shank portion 14 and a distal holding shank portion 15 with the head having a width greater than the width of the second restricted opening in the second side member of the connector adapted for being driven through a portion of the held member and into the holding member so that the distal holding shank portion penetrates a portion of the holding member for secure holding relation by the holding member and the proximal held shank portion is in secure closely held contact with a portion of the held member; the second held-holding fastener 36 and second plane 34 of the second metal side form a second selected angle 37; and the second restricted opening is formed with a width slightly larger than the width of the head end shank portion of the second held-holding fastener so that when the second held-holding fastener is inserted through the second restricted opening at the second selected angle, the opposed edges of the sides of the second restricted opening register with opposed sides of the head end shank portion of the second held-holding fastener and prevent relative movement between the second held-holding fastener and the connector.

Preferably, as shown in FIGS. 1 through 8, the connector is formed with a metal seat member 38 formed integrally with the first and second metal side members having a width and depth sufficient to serve as a structural seat for the held member; a second metal header side member 40 integrally attached at an angle to the second metal side member 33 and positioned in engagement with the planar connecting face 2 of the wood holding member and formed with at least one fastener opening 26 therethrough; and a header fastener 27 inserted through the fastener opening thereby joining the second metal header side to the holding member.

The connector may be further constructed as in FIGS. 1-8 with the first and second metal side members formed with a plurality of alternating edge protrusions 41 and indents 42 in a manner such that a protrusion on the edge of the first side member 7 is opposite an indent on the edge of the second side member 33; a plurality of the protrusions on the first metal side member are formed with one of the first restricted openings 9; a plurality of the protrusions on the second metal side member 33 are formed with one of the second restricted openings 35 at selected spaced intervals from the first restricted openings; and a plurality of first and second held-holding fasteners 10 and 36 for insertion through the restricted openings in the side members and into the held and holding wood members at the spaced intervals so that there is no interference between the first and second fasteners.

FIGS. 18-22 illustrate a novel variation of the connector of the present invention in which the first and second metal header side members 25 and 40 are formed with a plurality of alternating edge protrusions 56 and indents 57 in a manner such that when the header side members are folded inwardly toward one another, the held-holding fasteners 10 and 36 will not strike the protrusions 56.

Referring to FIGS. 1, 5, 6 and 8, the connector may include a first top flange 29 connected to the first metal header side member 25 at an angle and formed with a first top flange opening 30 therethrough; a first top flange fastener 31 dimensioned for insertion through the opening in the first top flange and into the holding member; a second top flange 43 connected to the second metal header side member 40 at an angle and formed with a second top flange opening 44 therethrough; and a second top flange fastener 31 dimensioned for insertion through the opening in the second top flange and into the holding member.

Referring, again, to FIGS. 1, 5, 6 and 8, the connector may include first and second side members formed with a plurality of first and second restricted openings disposed at spaced intervals; the first and second restricted openings are elongated slots having lengths substantially greater than their widths; first and second tab-like members 22 and 45 formed from the displaced face material from the first and second elongated slot-openings and bent along bend lines which constitute one end of each of the elongated slot opening; and each of the tab-like members are formed with a fastener receiving surface 24 as illustrated in FIG. 2 for positively receiving a side of one of the held-holding fasteners in generally parallel, face-to-face relationship, and the length of each of the elongated slots is selected to receive one of the fasteners only at either the first or second preselected angle in relation to the plan of the first or second metal side member so that one side of the shank of each of the fasteners is in touching or close fitting relation to one end of each of the elongated slot openings and the opposite side of each of the nail shanks is in touching or close fitting relation to the fastener receiving surface of the tab-like member.

Figures 7, 9:
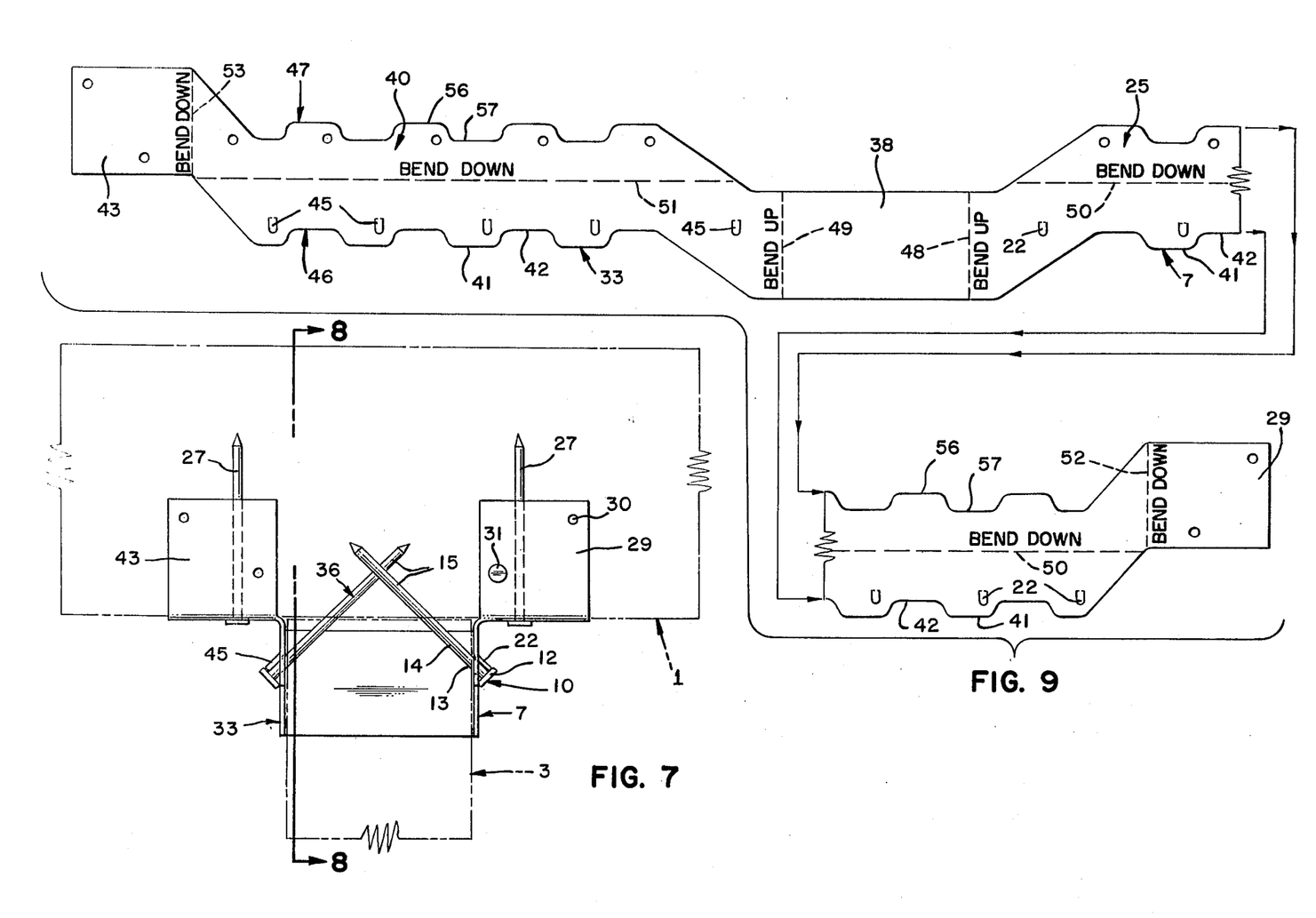
FIG. 7 is a top plan view of the connector shown in FIG. 5.
FIG. 9 is a top plan view of the connector shown in FIG. 1 prior to its formation from the sheet metal blank.
Figure 8:
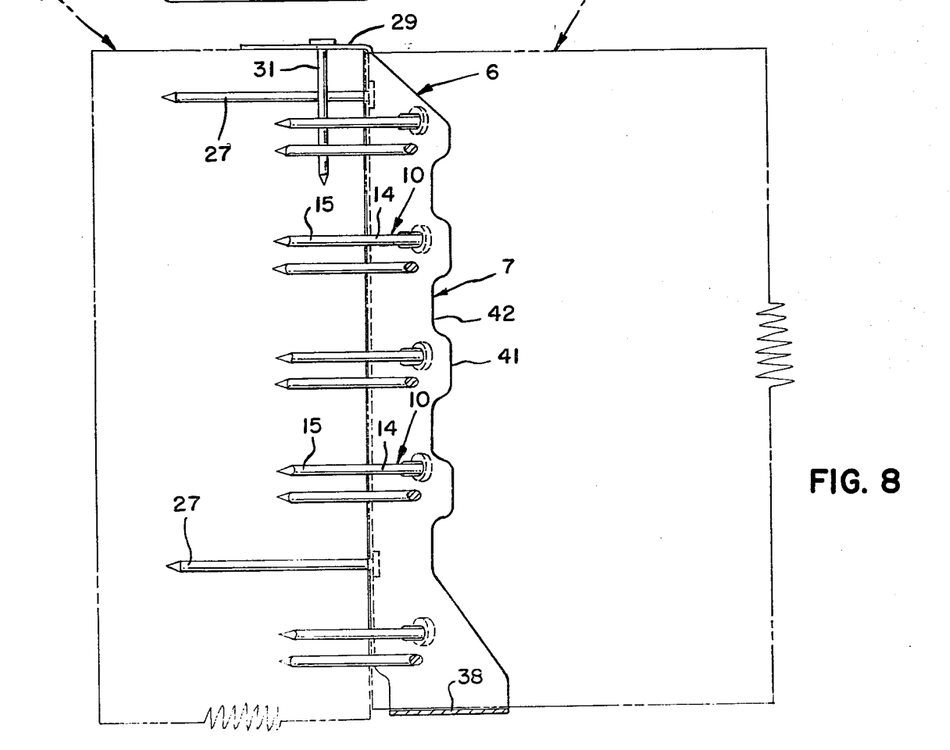
FIG. 8 is a cross sectional view of the connector shown in FIG. 7 taken along line 8—8. The supporting and supported members are shown in phantom line.

The connector of the present invention when used as a hanger may be formed from a sheet metal blank which is cut by a progressive die from a metal strip as shown in FIG. 9. The leading edge 46 of one blank is identical to the trailing edge of a previous blank and the trailing edge 47 of the blank is identical to the leading edge of the following blank. The seat 38 is formed by bending upwardly along parallel bend lines 48 and 49 and bend lines 50 and 51 divide the side members 7 and 33 from the header members 25 and 40. The top flanges 29 and 43 are formed along bend lines 52 and 53.

Figure 10:
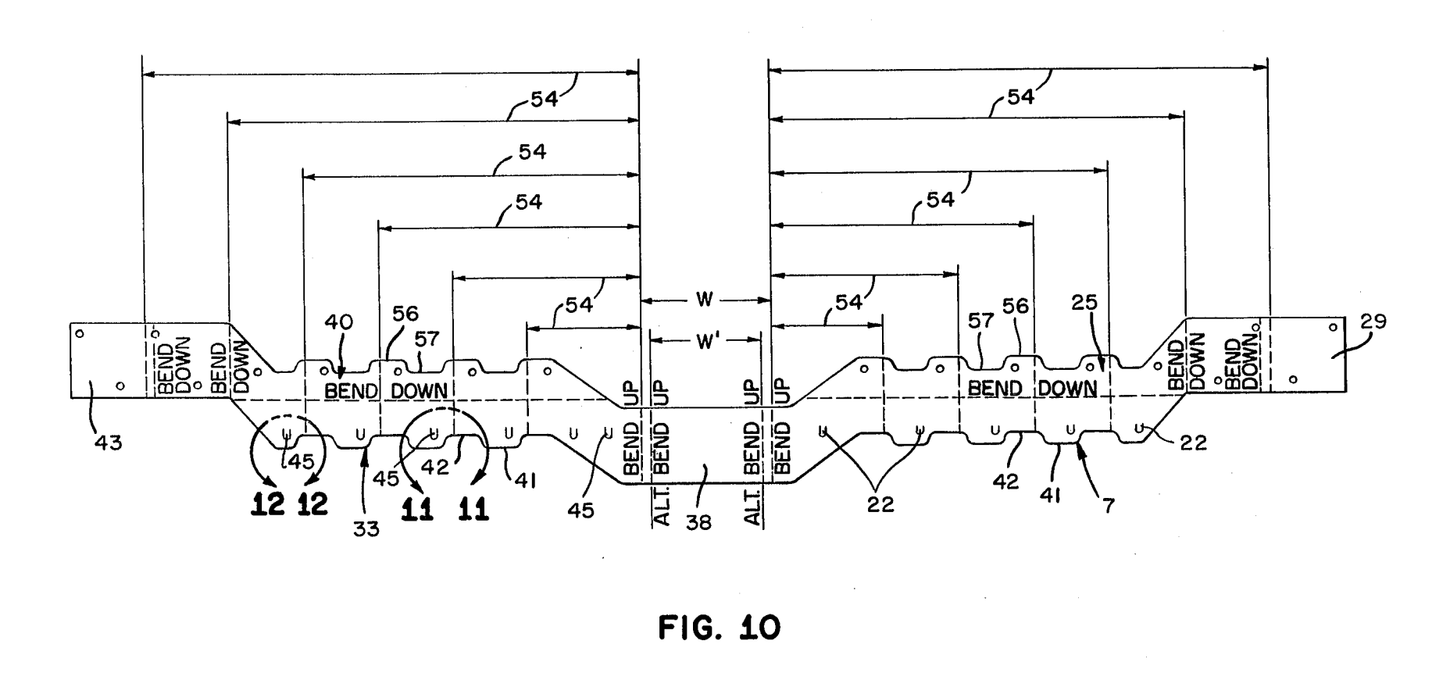
FIG. 10 is a top plan view of a blank sheet metal member prior to bending from which a plurality of different connectors can be made depending upon where the blank is cut and where the bends are made. This figure illustrates the fact that several types and sizes of connectors can be made with only slight modifications of the dies.
Figure 11:
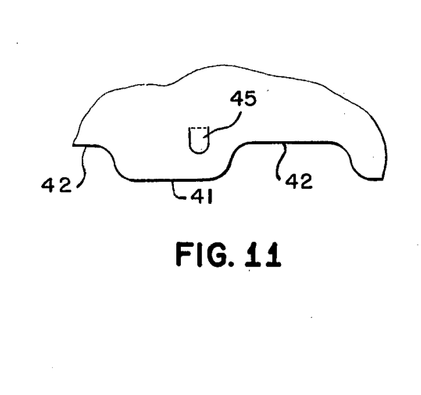
FIG. 11 is a plan view of a portion of the connector showing the nail guide means prior to bending and taken in the vicinity of line 11—11 in FIG. 10.
Figure 12:
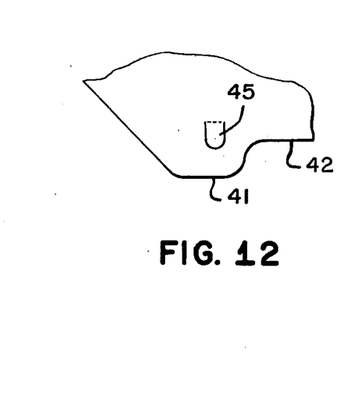
FIG. 12 is a top plan view of another portion of the connector showing the nail guide means prior to bending and taken in the vicinity of line 12—12 in FIG. 10.
Figure 13:
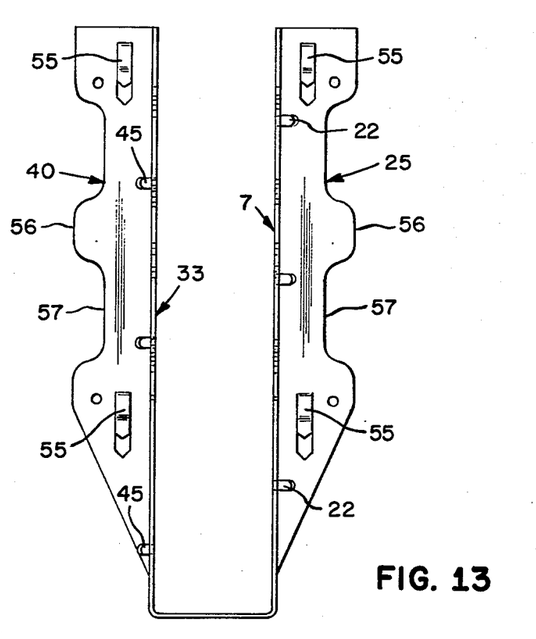
FIG. 13 is a front elevation view of still another form of the invention.
Figure 14:
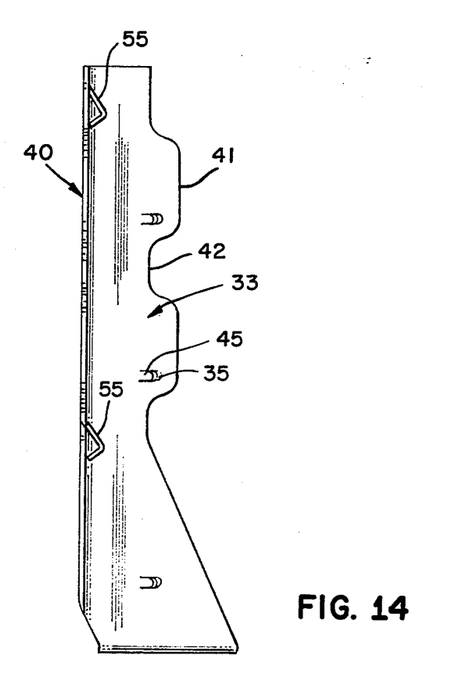
FIG. 14 is a side elevation view of the connector shown in FIG. 13.
Figure 15:
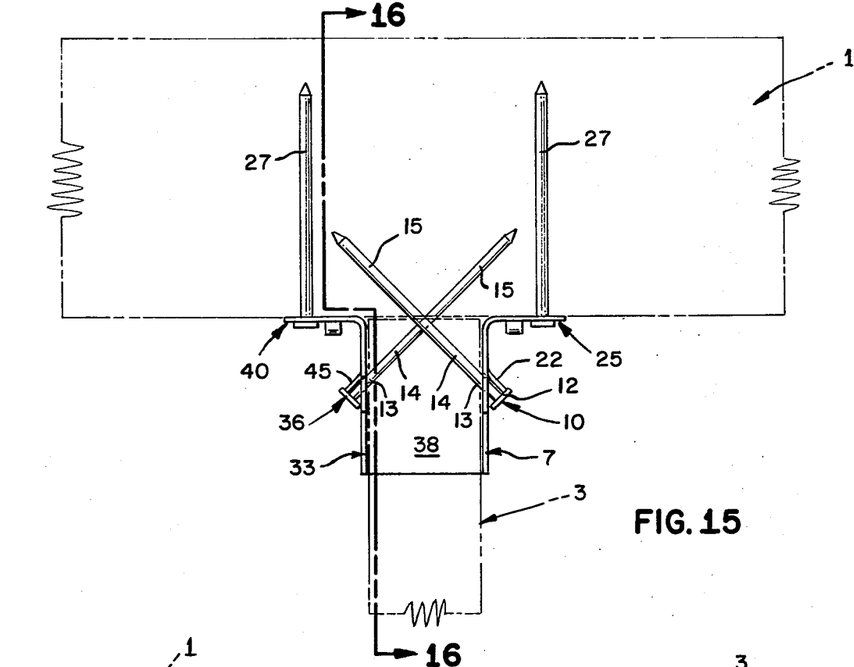
FIG. 15 is a top plan view of the connector shown in FIG. 13. The supporting and supported members are shown in phantom line.
Figure 16:
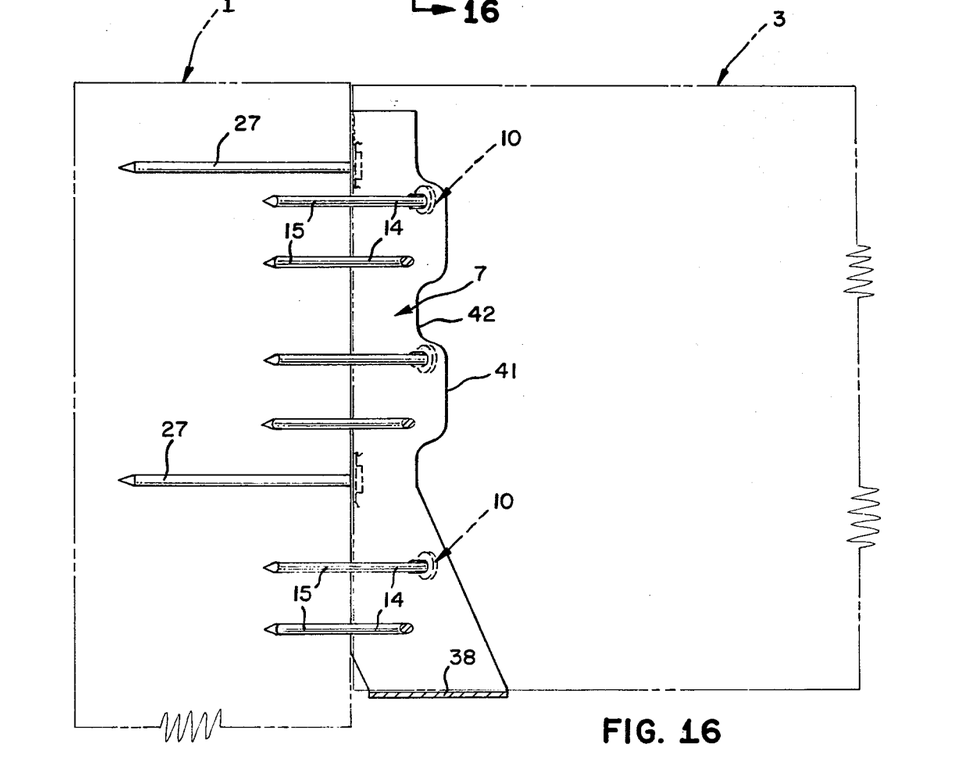
FIG. 16 is a cross section view of the connector shown in FIG. 15 taken along line 16—16.
Figure 17:
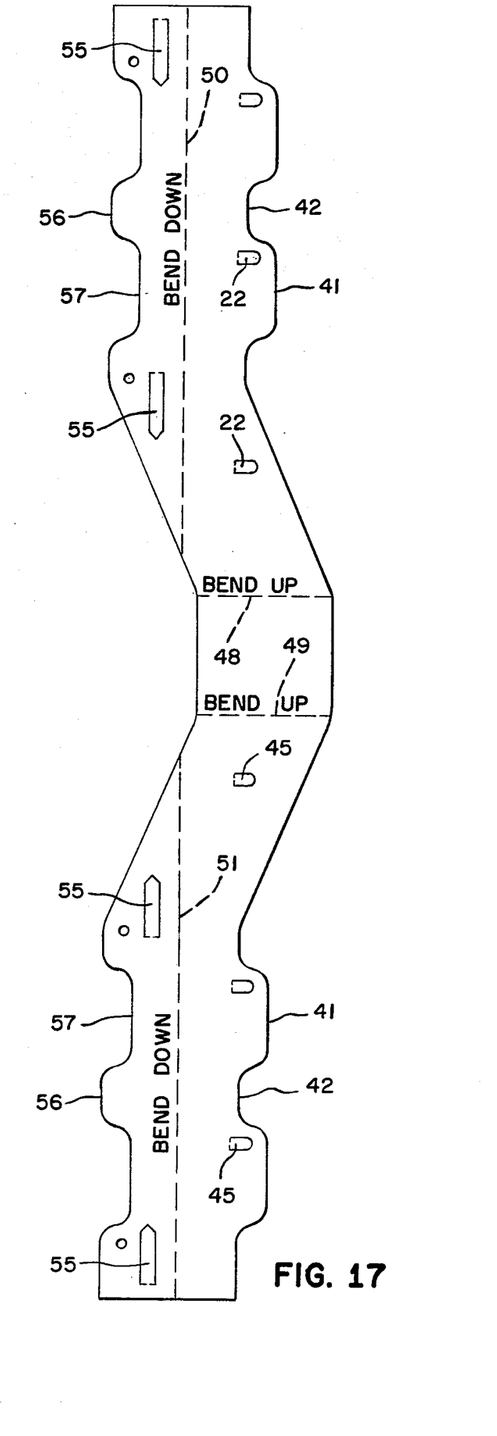
FIG. 17 is a top plan view of the sheet metal blank prior to bending which forms the connector illustrated in FIG. 13.
Figure 18:
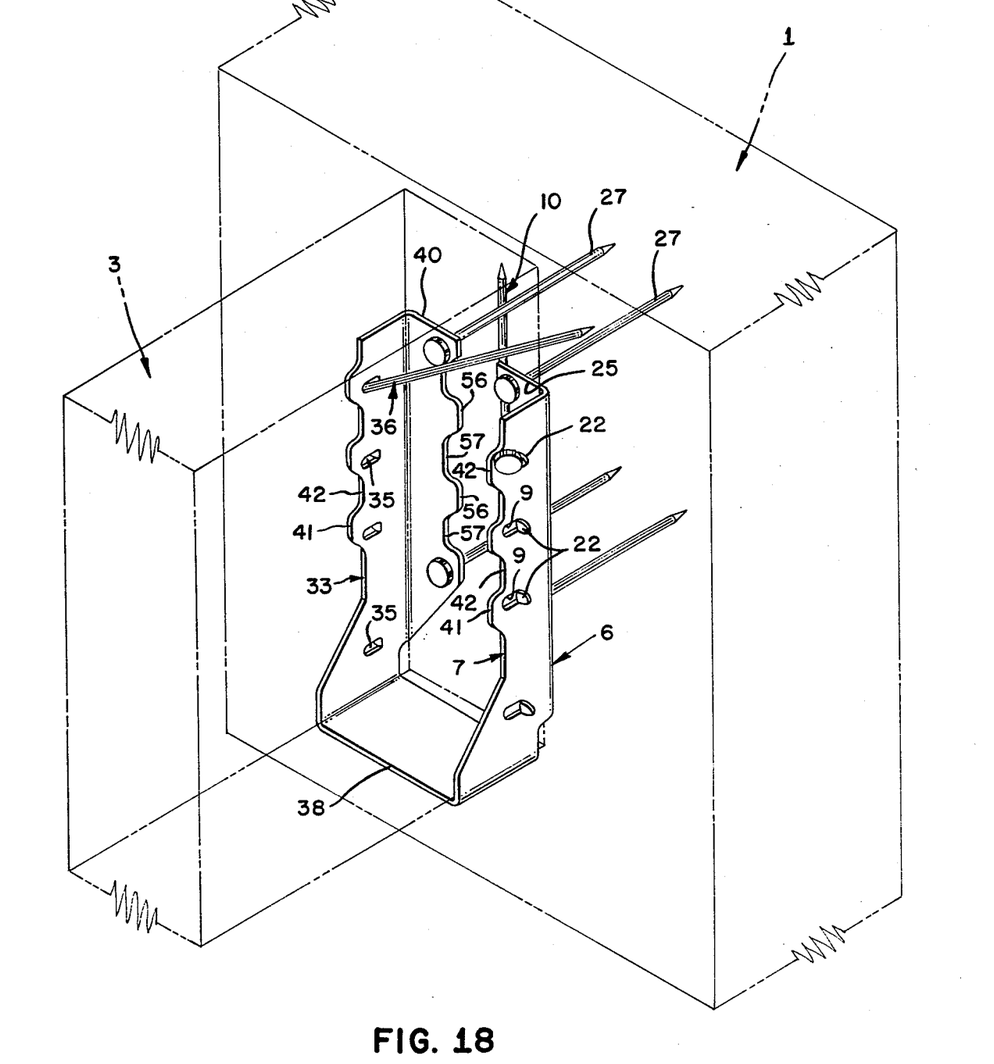
FIG. 18 is a perspective view of still another form of the connector. The supporting and supported members are shown in phantom line. Some of the nails are omitted for clarity.
Figure 19:
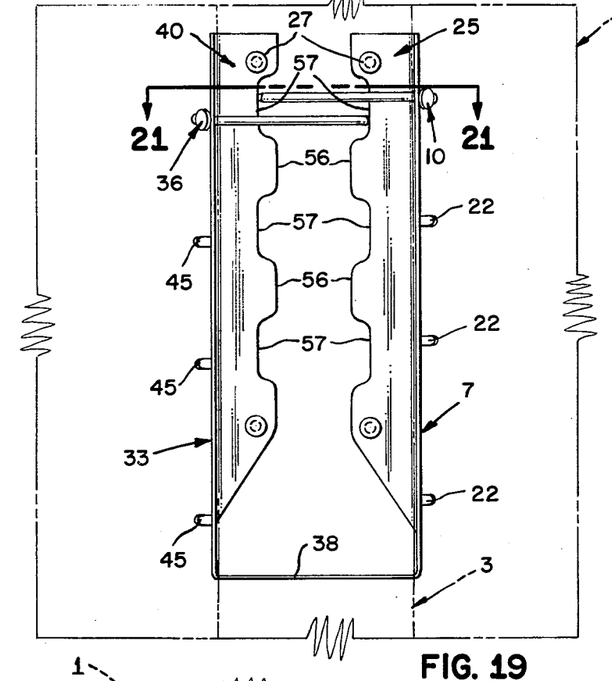
FIG. 19 is a front elevation view of the connector shown in FIG. 18.
Figure 20:
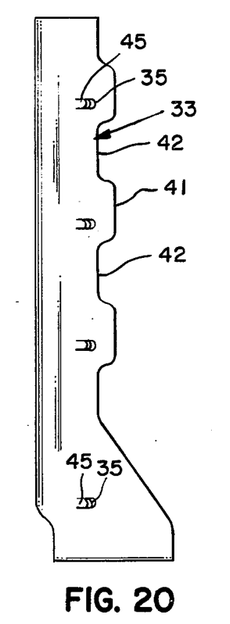
FIG. 20 is a side elevation view of the connector shown in FIG. 18.

FIG. 10 illustrates the general blank layout for progressive, fixed block die for making a plurality of different hangers for wood members of varying size by varying the coil width and some punch and logo changes. The double arrows 54 indicate the different coil widths for creating hangers of different stirrup and/or top flange lengths. The letters W and W' indicate the different seat widths that can be made and FIGS. 11 and 12 indicate different punch settings for creating the tab line members 22.

Referring to FIGS. 13-16, a common type of hanger constructed in accordance with the present invention is illustrated. In this form of the invention like parts of the previously described connectors are given identical numbers. As an additional feature, prong members 55 are formed in the connector as a convenience in initially attaching the connector to a beam member.

Figure 21:
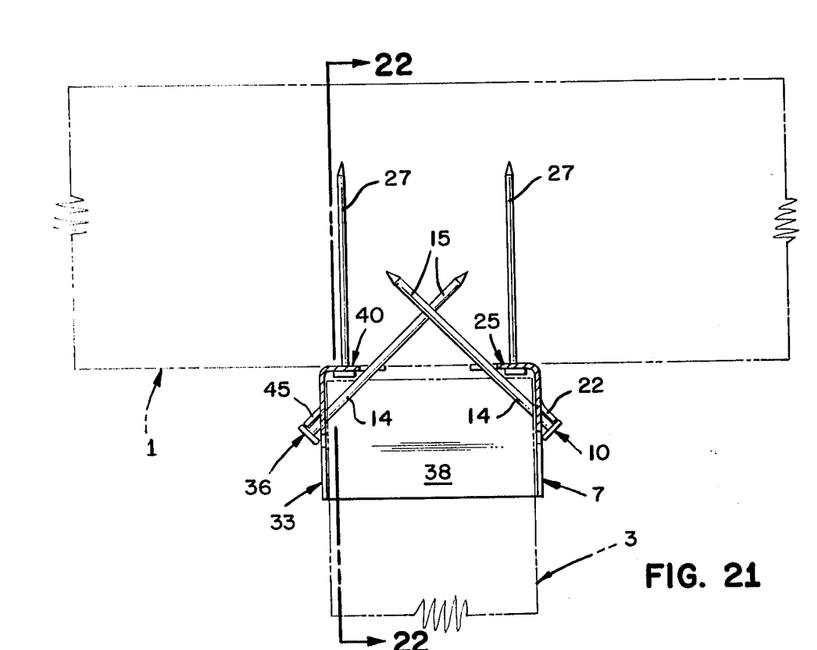
FIG. 21 is a top plan view of the connector shown in FIG. 18.
Figure 22:
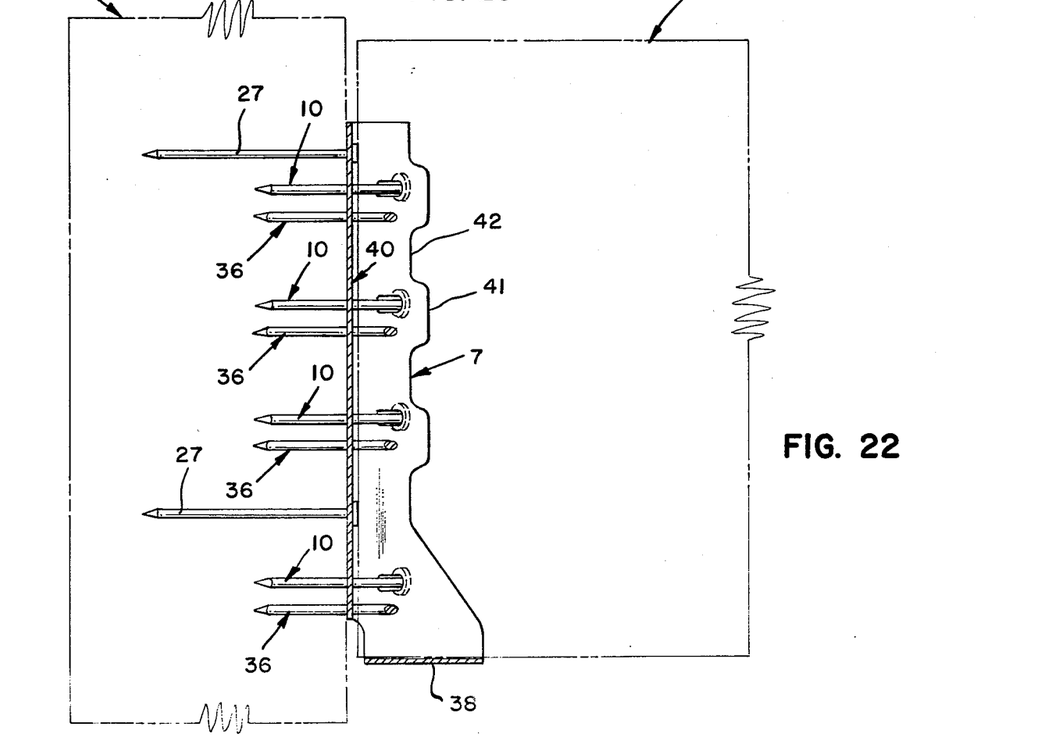
FIG. 22 is a cross sectional view of the connector taken along line 22—22 of FIG. 21.
Figure 23:
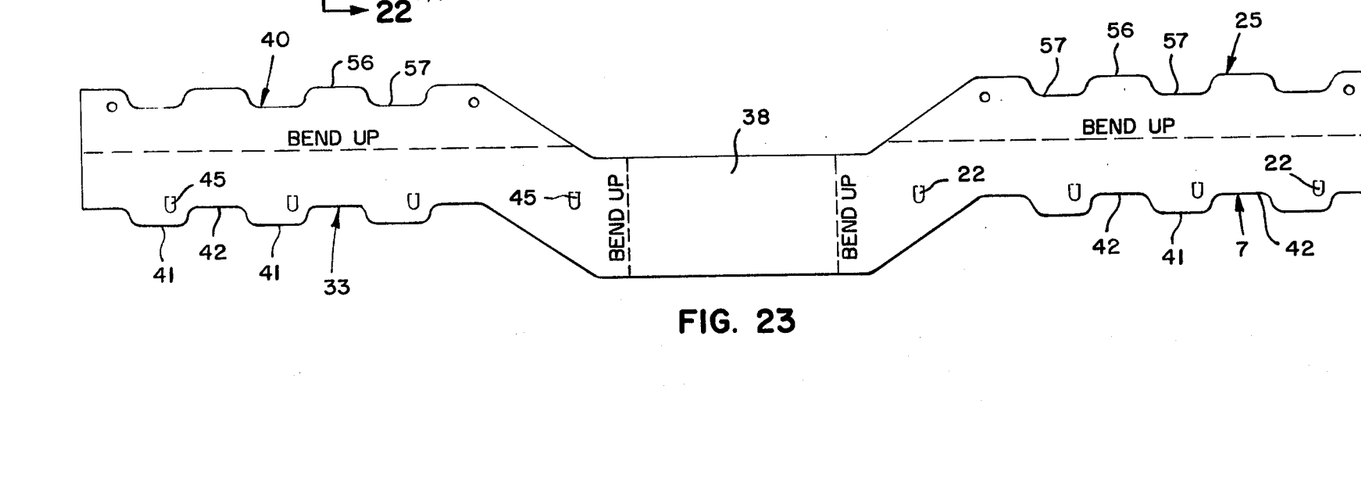
FIG. 23 is a top plan view of the blank used to make the connector shown in FIG. 18 prior to bending.

FIGS. 21 and 23 illustrate another common hanger connector which utilizes the present invention. Elements similar to elements previously described in connection with similar hangers have been given identical numbers. The hanger illustrated has no top flanges.

Figure 24:
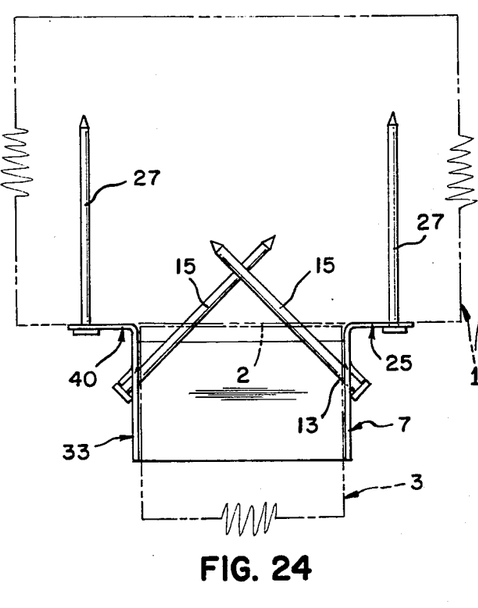
FIG. 24 is a top plan view which is illustrative of all of the hangers that can be made from the blank shown in FIG. 10 with the exception of the connectors having top flanges.
Figure 25:
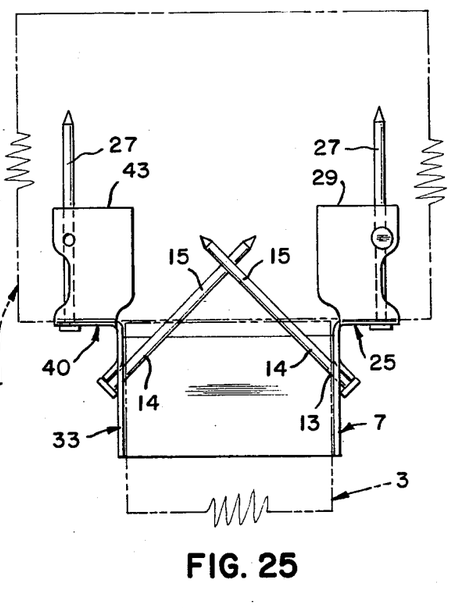
FIG. 25 is a top plan view of another form of connector with a top flange.
Figure 26:
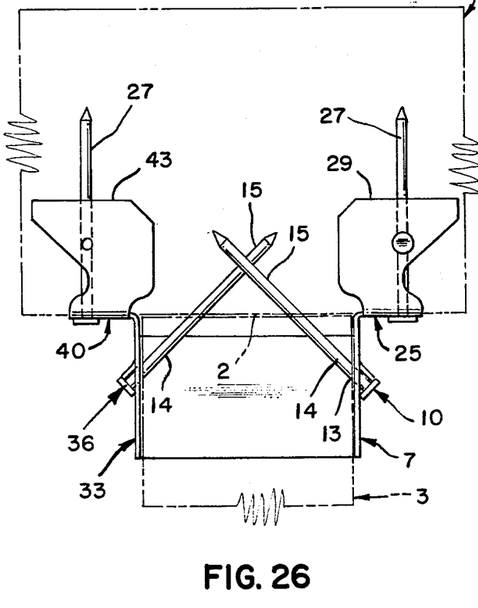
FIG. 26 is a top plan view of still another form of connector with still another type of top flange.
Figure 27:
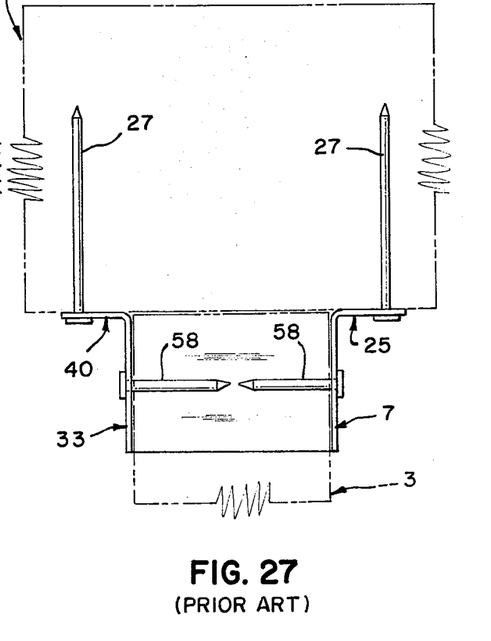
FIG. 27 is a top plan view of a typical prior art connector showing the standard nailing pattern in the supported and supporting members shown in phantom line.

The top view of the hangers shown in FIGS. 24–26 dramatically illustrate the unique difference of the connectors of the present invention from hangers of the prior art shown in FIG. 27. As previously stated, the fastening nails of the prior art hangers are in single shear, whereas the fasteners of the present invention are in double shear. In the present invention, as shown in FIGS. 24 through 26 one shear line is between the side member 7 and the head end shank portion 13 and the other shear line is at the interface of the planar connecting face 2 and the distal holding shank portion 15 of the fastener. The double shear phenomenon occurs in each held-holding fastener.

To install any one of the connectors illustrated, the connector is first attached to the holding beam 1 by fasteners 27 inserted through openings in the header side members 25 and 40. If the connector is formed with prongs 55 as in FIGS. 13–16, the prongs are hammered into the header. The joist member is then placed on the seat 38 and the first and second held-holding fasteners 10 and 36 are hammered through the restricted openings in the side members 7 and 33. The nails should be placed at the selected angles 17 and 37, and if the connector is provided with tab-like members 22, the workman merely permits the tab-like member to guide the nail at the proper angle. The nail or other type fastener is driven through an end portion of the held member 3 into the holding member 1.

If the connector only has a top flange 29 and no header side members, the top flange is initially connected to the header member 1.

In some instances, it is desirable to first connect the connector to the held member. This may be done by driving the held-holding fasteners 10 and 36 partially into the held member. The connector is then attached to the holding member by the fasteners and finally, the held-holding fasteners are driven into the holding member.

Applicants have run hundreds of tests on the connector of the present invention in comparison with comparable state of the art connectors. Tests have also been conducted by an independent laboratory; testing Engineers of Oakland and the results on two (2) out of seventeen (17) representative types of connectors are set forth below. The connector designated "prior art" uses one set of nails to fasten the connector to the holding member and another set of nails to connect the connector to the held member as in the connector shown in FIG. 27. These test have been submitted to the International Conference of Building Officials and the results will be taken before the National Review Board which administers the Uniform Building Code.

|  | PRESENT INVENTION | PRIOR ART | DIFFERENCE |
| --- | --- | --- | --- |
| (1) Model | U S 46 | U 46 |  |
| Nails | 8 | 12 |  |
| Difference in Nails |  |  | −4 |
| % Difference in Nails |  |  | −33% |
| Weight of Connector | .469 lb. | .460 lb. |  |
| Difference in Weight |  |  | +.009 lb. |
| % Difference in Weight |  |  | +2% |
| Utlimate Strength | 7,800 lb. | 5,000 lb. |  |
| Difference in Strength |  |  | +2800 lbs. |
| % Difference in Strength |  |  | +56% |
| ICBO Normal Allowance (Expected) | 1070 lb. | 1070 lb. |  |

|  | PRESENT INVENTION | PRIOR ART | DIFFERENCE |
| --- | --- | --- | --- |
| (2) Model | HUS 410 | HU 410 |  |
| Nails | 16 | 20 |  |
| Difference in Nails |  |  | −4 |
| % Difference in Nails |  |  | −20% |
| Weight of Connector | .933 lb. | 1.230 lb. |  |
| Difference in Weight |  |  | −.297 lb. |
| % Difference in Weight |  |  | −24% |
| Ultimate Strength | 14,550 lb. | 9,850 lb. |  |
| Difference in Strength |  |  | +4,700 lb. |
| % Difference in Strength |  |  | +48% |
| ICBO (expected) | 2,140 lb. | 1,875 lb. |  |

The estimated total U.S. yearly market of the U S 46 connector is 1,000,000 units. The total estimated yearly savings in metal is approximately 9,000 lbs. The market for the HUS is about 250,000 per year and the metal savings is an estimated 74,250 lbs per year.

The weight savings in the HUS 410 connectors of the present invention is largely due to the fact that the seat may be reduced from 2½" to 2". Since the connectors are made on a progressive die, the sides and header sides may also be reduced in size. This dramatically reduces the metal needed to construct the hanger.

The expected ICBO values are increased because in the connector of the present invention, all nails are driven into the holding member whereas in the prior art connectors roughly half of the fasteners are driven into the holding member only and provide no holding support whatsoever.

The reason for the surprising increase in load value may be understood as follows:

Load carrying capacity in a connector such as a hanger utlimately depends upon (a) either the shear value of the fasteners penetrating the holding member or (b) the value of support given by the top flange element of the hanger.

The essence of the present invention is the new and effective use of these values. This is accomplished by the support values (i.e. either the top flange value or the fastener value) being transmitted through the connector to the head end shank portion of the held-holding fastener thus creating one leg of the double shear support. This is a synergistic effect as it is additive in value to the original and still present value of support given to the held member by the holding member through the seat of the connector.

The opposite end of the double shear support transmitting load carrying is directly between the carrying member and the carried member by shear at approximately the midpoint of the fastener. Since the fastener as described is in double shear relationship with two point support, this support point is far more efficient than a simple open toe-nail connection.

Thus, in the connector of the present invention, the use of the fastener has been expanded from its original simple purpose of nailing two boards together in single shear to a double shear function due to the fact that one support point namely metal to metal adjacent to the head is equal to the support point of the fastener at the wood-to-wood connection. In this regard, it should be noted that any metal thickness less than 18 gauge does not develope the full edge bearing for a nail. Further, the fastener must be confined in the restricted opening. The fastener must register with the opening or the bearing support will not be attained.

As used in the specification, fastener may be understood to include common wire nails, screws, lag screws, hardened nails or square or rectangular cross section nails. The connector of the present invention is presently used with common wire nails because of their wide availability. The load values in the two examples are based on common wire nails. It has been discovered, however, that the connector is substantially more efficient and ultimate failure is substantially increased by the use of harder nails or by lag screws which are harder than common nails. The reason for the phenominal increase with stiffer nails is the fact that with soft nails, failure at ultimate load occurs by bending of the nails; not by destruction of the connector. Increasing fastener hardness increases the resistance to bending. Present wire nails are referred to as being "¼ hard". Nails that are "½ hard" are presently available through Simpson Strong Tie, Inc. of San Leandro, Calif. Nails of "¾ hard" are also available and provide the greatest resistance to bending.

The ICBO rating is affected by another factor. In the prior art connectors, the nails are assumed to penetrate only one-half their length. Thus, a 16d nail which is 3½ inches long is assumed to penetrate 1¾ inches and the support rating is "1¾". On the other hand, the fastener of the present invention is supported throughout its entire length and is therefore given a full value of "3½".

The connector of the present invention is easier to install than prior art connectors. The reason is not readily obvious. It has been found that it is easier to drive the fastener at a 45° angle rather than parallel to the holding member. It is simply easier for the carpenter to swing his hammer. Actual tests have found that installation time of the connector of the present invention is just half the time necessary to install a prior art connector.

Seismic or hurricane loads are not readily handled by the prior art hangers. The reason is that the nails are driven directly into the holding member and tend to pull out. With the connector of the present invention, on the other hand, the fasteners are angled across the direction of the seismic and hurricane imposed forces rather than parallel to the direction of the forces.

Another unexpected result of using the connector of the present invention is the fact that carpentors do not have to carry nails having two different lengths. The reason is that in the prior art hangers, as shown in FIG. 27, nails 58 which are driven into the held member 3 are shorter than the nails 27 which are driven into the holding meaber 1. Carpenters who install the hanger of the present invention have been appreciative of the fact that their standard "apron nail" can be used to install the connector. They also have found that it is easier and faster to install the connector of the present invention with long nails. The short nails used to fasten the prior art connector to the holding member are harder to hold than longer nails at the first swing of the hammer. Short nails have been aptly called "thumb busters" by the trade.

We claim:

1. A sheet metal wood-to-wood structural connector for joining wood members the connection comprising:
   a. an elongated wood structural holding member having a generally planar connecting face;
   b. an elongated wood structural held member having a generally planar first side face and a generally planar end face in abutting face-to-face contact with said planar connecting face;
   c. said connector having a first metal side member having portions in a first plane engaging said first side face of said held member and formed with a first restricted opening therethrough;
   d. a first held-holding fastener for double-shear connection having a shank formed with a head, a head end shank portion, a proximal held shank portion and a distal holding shank portion with said head having a width greater than the width of said first restricted opening in said side member of said connector, adapted for being driven through a portion of said held member and into said holding member so that said distal holding shank portion penetrates a portion of said holding member for secure holding relation by said holding member and said proximal held shank portion is in secure closely held contact with a portion of said held member;
   e. said first held-holding fastener and said first plane of said first metal side form a first selected angle;
   f. said first restricted opening is formed with a width slightly larger than the width of said head end shank portion of said first held-holding fastener so that when said first fastener is inserted through said first restricted opening at said first selected angle, the sides of said first restricted opening register with opposed sides of said head end shank portion of said first held-holding fastener and prevent relative movement between said first held-holding fastener and said connector;
   g. a first metal header side member integrally attached at an angle to said first metal side member and positioned in engagement with said planar connecting face of said wood holding member and formed with at least one header fastener opening therethrough; and
   h. a header fastener for single-shear connection inserted through said header fastener opening joining said metal header side to said holding member and thereby causing said head end shank portion of said first held-holding fastener to be securely held in relation to said holding member, resulting in a reduction in end splitting of said held member due to the relative absense of bending in said proximal held shank portion of said first held-holding fastener under normal design loading.

2. A sheetmetal connector as described in claim 1 comprising:
   a. said first side member is formed as a substantially planar member and said restricted opening is an elongated slot having a length substantially greater than its width.

3. A sheetmetal connector as described in claim 1 comprising:
   a. a tab-like member formed from the displaced face material from said first restricted opening and bent along a bend line which constitutes one end of said opening;
   b. said tab-like member is formed with a fastener receiving surface for positively receiving a side of said first held-holding fastener in generally parallel, face-to-face relationship; and
   c. the length of said first restricted opening is selected to receive said first held-holding fastener only at said pre-selected angle in relation to said first plane of said first metal side member so that one side of said shank of said fastener is in touching or close fitting relation to one end of said first restricted opening and the opposite side of said nail shank is in touching or close fitting relation to said fastener receiving surface of said tab-like member.

4. A sheetmetal connector as described in claim 1 comprising:
   a. said proximal held shank portion and said distal holding shank portion of said fastener are each embedded an approximately equal distance in said held and holding members respectively.

5. A connector as described in claim 1 comprising:
   a. a first top flange connected to said first metal header side member at an angle and formed with a first top flange opening therethrough; and
   b. a first top flange fastener for single-phase connection dimensioned for insertion through said opening in said first top flange and into said holding member.

6. A sheetmetal connector as described in claim 1 comprising:
   a. said elongated wood structural held member includes a second generally planar side face and a bottom edge face;
   b. a second metal side member having portions in a second plane engaging said second side face of said held member and formed with a second restricted opening therethrough;
   c. a metal strap member joining said first and second metal side members and positioned in engagement with said edge face of said held member to assist in positioning said connector;
   d. a second held-holding fastener for double-shear connection having a shank formed with a head, a head end shank portion, a proximal held shank portion and a distal holding shank portion with said head having a width greater than the width of said second restricted opening in said second side member of said connector adapted for being driven through a portion of said held member and into said holding member so that said distal holding shank portion penetrates a portion of said holding member for secure holding relation by said holding member and said proximal held shank portion is in secure closely held contact with a portion of said held member;
   e. said second held-holding fastener and said second plane of said second metal side form a second selected angle; and
   f. said second restricted opening is formed with a width slightly larger than the width of said head end shank portion of said second held-holding fastener so that when said second held-holding fastener is inserted through said second restricted opening at said second selected angle, the opposed edges of the sides of said second restricted opening register with opposed sides of said head end shank portion of said second held-holding fastener and prevent relative movement between said second held-holding fastener and said connector.

7. A connector as described in claim 6 comprising:
   a. said metal strap member is formed integrally with said first and second metal side members having a width and depth sufficient to serve as a structural seat for said held member.

8. A connector as described in claim 7 comprising:
   a. said first and second metal side members are formed with a plurality of alternating edge protrusions and indents in a manner such that a protrusion on said edge of said first side member is opposite an indent on said edge of said second side member;
   b. a plurality of said protrusions on said first metal side member are formed with one of said first restricted openings;
   c. a plurality of said protrusions on said second metal side member are formed with one of said second restricted openings at selected spaced intervals from said first restricted openings; and
   d. a plurality of first and second held-holding fasteners for double-shear connection for insertion through said restricted openings in said side members and into said held and holding wood members at said spaced intervals so that there is no interference between said first and second fasteners.

9. A connector as described in claim 8 comprising:
   a. a second metal header side member integrally attached at an angle to said second metal side member and positioned in engagement with said planar connecting face of said wood holding member and formed with at least one header fastener opening therethrough;
   b. a header fastener for single-shear connection inserted through said second header fastener opening joining said second metal header side to said holding member and thereby causing said head end shank portion of said second held-holding fastener to be securely held in relation to said holding member; and
   c. said first and second metal header side members are formed with a plurality of alternating edge protrusions and indents in a manner such that when said header side members are folded inwardly toward one another said held-holding fasteners will not strike said protrusions.

10. A connector as described in claim 7 comprising:
    a. a first top flange connected to said first metal header side member at an angle and formed with a first top flange opening therethrough;
    b. a first top flange fastener for single-shear connection dimensioned for insertion through said opening in said first top flange and into said holding member;
    c. a second metal header side member integrally attached at an angle to said second metal side member and positioned in engagement with said planar connecting face of said wood holding member and formed with at least one header fastener opening therethrough;
    d. a header fastener for single-shear connection inserted through said second header fastener opening joining said second metal header side to said holding member and thereby causing said head end shank portion of said second held-holding fastener to be securely held in relation to said holder member;
    e. a second top flange connected to said second metal header side member at an angle and formed with a second top flange opening therethrough; and
    f. a second top flange fastener for single-shear connection dimensioned for insertion through said opening in said second top flange and into said holding member.

11. A connector as described in claim 10 comprising:
    a. said first and second side members are formed with a plurality of said first and second restricted openings disposed at spaced intervals;
    b. said first and second restricted openings are elongated slots having lengths substantially greater than their widths;

c. first and second tab-like members formed from the displaced face material from said first and second elongated slot-openings and bent along bend lines which constitute one end of each of said elongated slot openings; and
d. each of said tab-like members are formed with a fastener receiving surface for positively receiving a side of one of said held-holding fasteners in generally parallel, face-to-face relationship, and the length of each of said elongated slots is selected to receive one of said fasteners only at either said first or second pre-selected angle in relation to said plane of said first or second metal side member so that one side of the shank of each of said fasteners is in touching or close fitting relation to one end of each of said elongated slot openings and the opposite side of each of said nail shanks is in touching or close fitting relation to said fastener receiving surface of said tab-like member.

12. A sheetmetal connector as described in claim 1 comprising:
a. said first held-holding fastener has a hardness greater than one-quarter hardness for increasing the resistance to bending of said fastener.

13. A sheet metal wood-to-wood connector for joining wood members, the connection comprising:
a. an elongated wood structural holding member having a generally planar connecting face;
b. an elongate wood structural held member having a generally planar first side face and a generally planar end face in abutting face-to-face contact with said planar connecting face;
c. said connector having a first metal side member having portions in a first plane engaging said first side face of said held member and formed with a first restricted opening therethrough;
d. a first held-holding fastener for double-shear connection having a shank formed with a head, a head end shank portion, a proximal held shank portion and a distal holding shank portion with said head having a width greater than the width of said first restricted opening in said side member of said connector, adapted for being driven through a portion of said held member and into said holding member so that said distal holding shank portion penetrated a portion of said holding member for secure holding relation by said holding member and said proximal held shank portion is in secure closely held contact with a portion of said held member;
e. said first held-holding fastener and said first plane of said first metal side form a first selected angle;
f. said first restricted opening is formed with a width slightly larger than the width of said head end shank portion of said first held-holding fastener so that when said first fastener is inserted through said first restricted opening at said first selected angle, the sides of said first restricted opening register with opposed sides of said head end shank portion of said first held-holding fastener and prevent relative movement between said first held-holding fastener and said connector;
g. a first top flange having a depending member connected to said first metal side member at an angle and formed with a first top flange opening therethrough; and
h. a first top flange fastener for single-shear connection dimensioned for insertion through said opening in said first top flange and into said holding member.

14. A sheet metal connector as described in claim 13 comprising:
a. said elongated wood structural held member includes a second generally planar side face;
b. a second metal side member connected to said depending member of said first top flange having portions in a second plane engaging said second side face of said held member and formed with a second restricted opening therethrough;
c. a second held-holding fastener for double-shear connection having a shank formed with a head, a head end shank portion, a proximal held shank portion and a distal holding shank portion with said head having a width greater than the width of said second restricted opening in said second side member of said connector adapted for being driven through a portion of said held member and into said holding member so that said distal holding shank portion penetrates a portion of said holding member for secure holding relation by said holding member and said proximal held shank portion is in secure closely held contact with a portion of said held member;
d. said second held-holding fastener and said second plane of said second metal side form a second selected angle; and
e. said second restricted opening is formed with a width slightly larger than the width of said head end shank portion of said second held-holding fastener so that when said second held-holding fastener is inserted through said second restricted opening at said second selected angle, the opposed edges of the sides of said second restricted opening register with opposed sides of said head end shank portion of said second held-holding fastener and prevent relative movement between said second held-holding fastener and said connector.

15. A sheetmetal connector as described in claim 13 comprising:
a. said first held-holding fastener has a hardness greater than one-quarter hardness for increasing the resistance to bending of said fastener.

* * * * *